(No Model.)
W. AUBERLIN.
BALL BEARING.
No. 574,700.
Patented Jan. 5, 1897.
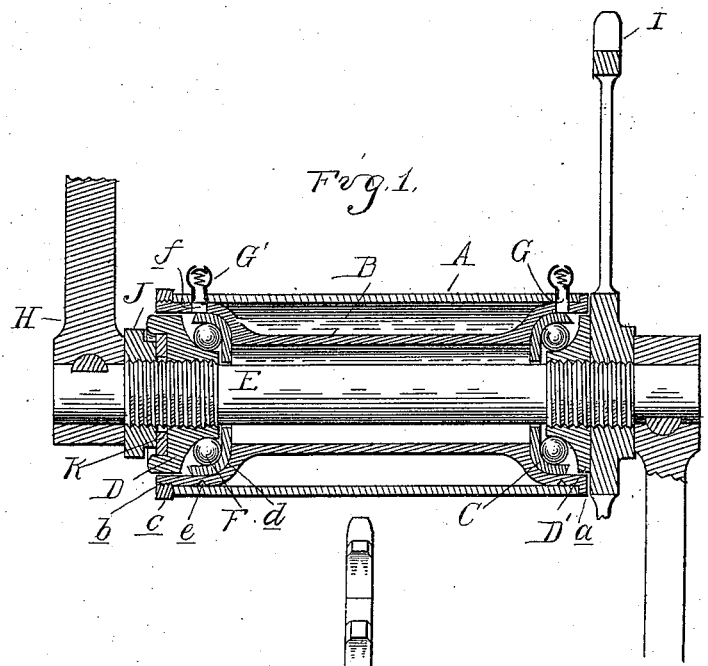
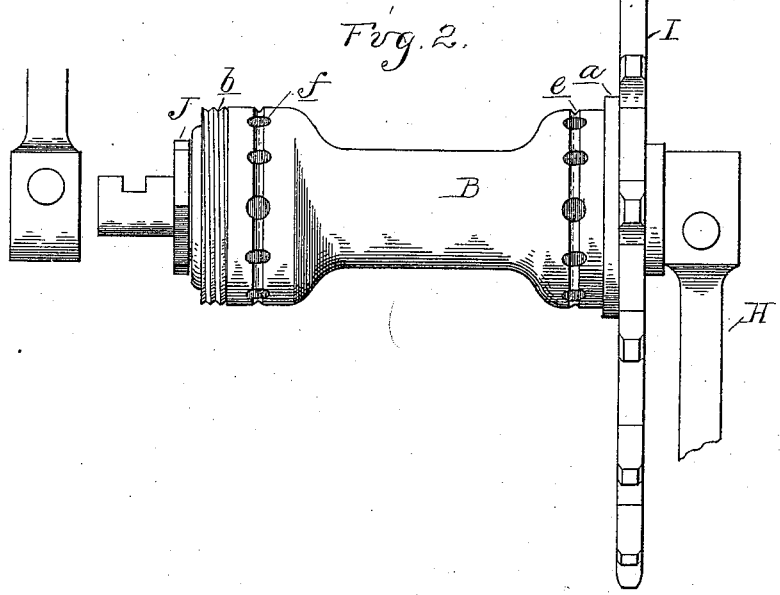
Witnesses
O. F. Barthel
Wm. O. Dogherty
Inventor
William Auberlin
By Thos. S. Sprague & Son
Attys.

UNITED STATES PATENT OFFICE.

WILLIAM AUBERLIN, OF DETROIT, MICHIGAN, ASSIGNOR OF ONE-HALF TO FRANK W. WEYHER AND FREDERICK C. WEYHER, OF SAME PLACE.

BALL-BEARING.

SPECIFICATION forming part of Letters Patent No. 574,700, dated January 5, 1897.

Application filed April 7, 1896. Serial No. 586,522. (No model.)

*To all whom it may concern:*

Be it known that I, WILLIAM AUBERLIN, a citizen of the United States, residing at Detroit, in the county of Wayne and State of Michigan, have invented certain new and useful Improvements in Ball-Bearings, of which the following is a specification, reference being had therein to the accompanying drawings.

My invention relates to a ball-bearing for bicycles adapted to be removed from the machine intact for adjustment or repair.

The invention consists in the peculiar construction, arrangement, and combination of parts whereby the bearing is rendered practically dust-proof, is easily removed and replaced, and is provided with means for readily oiling the same.

In the drawings, Figure 1 is a central longitudinal section through my bearing as applied to a crank-hanger, and Fig. 2 is an elevation of the bearing detached.

A is a tube forming an integral part of the bicycle. In the drawings I have shown this tube as constituting the crank-hanger, and I shall describe my bearing as applied to that part of the machine, but it is equally well adapted to be used in other places as for the wheels or pedals.

B is a bearing-tube removably secured in the tube A, preferably by providing it on one end with an annular flange $a$, adapted to bear against the end of the tube A, and at the other end with a screw-threaded portion $b$, with which a clamping-nut $c$ is engaged. This tube carries the ball-bearing, comprising the ball-races C, the cones D and D' on the crankshaft E, and the balls F.

The ball-races C may form an integral part of the tube B; but I preferably form them of separate cup-shaped pieces of metal fitting against a shoulder $d$ in the tube B. Around the ends of the tube B, near the ends of the ball-races, are formed the annular grooves $e$, adapted when the bearing is in place to register with the oil-apertures G, formed in the tube A, which latter may be provided with oil-cups G'.

$f$ are a series of perforations through the tube B, connected with the grooves $e$.

The cones D and D' are made to fit closely within the tube B, so as to exclude the dust, and the oil passing through the grooves $e$ and apertures $f$ will fall on the curved inner face of the cones and be directed against the balls.

H are the cranks.

I is the sprocket-wheel.

J is the clamping-nut for the adjustable cone D, and K is a washer between said nut and cone, all of well-known construction.

I preferably make the hub of the sprocket so as to come in proximity to the end of the tube B and form an additional dust-guard.

A bearing thus constructed may be readily removed from the frame-tube A by simply removing one of the cranks and unscrewing the clamping-nut $c$, when the tube B may be slipped out from the tube A, leaving the bearing intact and on the axle. In replacing the tube B no care is required to place it in any particular position, as the annular oil-grooves $e$ will register with the oil-aperture G in whatever way the tube may be turned.

What I claim as my invention is—

1. The combination with a tube forming a fixed or integral part of the bicycle and having an oil-aperture formed therethrough, of a bearing-tube removably secured in said fixed tube and provided with an exterior annular groove, with perforations at one or more points therein through the tube, said groove being adapted to register with the oil-aperture in the fixed tube and forming an oil-channel to the bearing and balls in the removable tube.

2. The combination with the tube A forming an integral part of the bicycle and having an oil-aperture formed therethrough, of the bearing-tube B removably secured within the tube A and provided with the annular groove $e$ and perforations $f$, said groove adapted to register with said oil-aperture in the tube A and forming an oil-channel to the bearing and balls in the bearing-tube.

3. The combination with the tube A forming an integral part of the bicycle of the bearing-tube B and adapted to fit within the tube A having the annular flange $a$ at one end, the screw-threaded portion $b$ at the other end and an annular groove $e$ formed exteriorly therein with perforations $f$ through the tube, said groove being adapted to register with an oil-hole in the tube A and forming an oil-channel to the bearing, the clamping-nut c engaged with the screw-threaded portion b of the tube and balls in the bearing-tube.

4. The combination with the tube A forming an integral part of the bicycle, of a bearing removably secured therein and comprising the tube B having the annular flange $a$, the screw-threaded portion $b$, the annular grooves $e$ provided with the perforations $f$ and registering with oil-apertures in the tube A, the cones D and D' on the shaft E' fitting within the ends of the tube B, the clamping-nut c engaging with the screw-threaded portion $b$ and balls in the tube B.

5. The combination of a tube A, a bearing removably secured therein and comprising a tube B having an annular flange at one end, a screw-threaded portion at the opposite end, the clamping-nut c on the screw-threaded portion, the shaft, the cones D and D' thereon fitted within the ends of the tube B, and balls fitted between the tube B and the cones, substantially as described.

In testimony whereof I affix my signature in presence of two witnesses.

WILLIAM AUBERLIN.

Witnesses:
JAS. WHITTMORE,
M. B. O'DOGHERTY.